US011543538B2

(12) United States Patent
Whitefield et al.

(10) Patent No.: US 11,543,538 B2
(45) Date of Patent: Jan. 3, 2023

(54) APPARATUS AND METHODS FOR INTERFERENCE MITIGATION BY SATELLITE NETWORKS

(71) Applicant: HUGHES NETWORK SYSTEMS, LLC, Germantown, MD (US)

(72) Inventors: David Whitefield, Gaithersburg, MD (US); Matthew Baer, Gaithersburg, MD (US); George Choquette, Potomac, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 8 days.

(21) Appl. No.: 17/144,296

(22) Filed: Jan. 8, 2021

(65) Prior Publication Data

US 2021/0132234 A1    May 6, 2021

Related U.S. Application Data

(62) Division of application No. 15/624,619, filed on Jun. 15, 2017, now Pat. No. 10,921,458.

(60) Provisional application No. 62/350,671, filed on Jun. 15, 2016, provisional application No. 62/351,720, filed on Jun. 17, 2016.

(51) Int. Cl.
| | |
|---|---|
| *G01S 19/21* | (2010.01) |
| *G01S 19/22* | (2010.01) |
| *H04B 7/185* | (2006.01) |
| *H04B 7/204* | (2006.01) |
| *H04B 7/26* | (2006.01) |
| *H04W 72/04* | (2009.01) |

(52) U.S. Cl.
CPC .............. *G01S 19/21* (2013.01); *G01S 19/22* (2013.01); *G01S 19/215* (2013.01); *H04B 7/18504* (2013.01); *H04B 7/18513* (2013.01); *H04B 7/2041* (2013.01); *H04B 7/265* (2013.01); *H04W 72/0453* (2013.01)

(58) Field of Classification Search
CPC ........ G01S 19/21; G01S 19/215; G01S 19/22; H04B 7/18504; H04B 7/15813; H04B 7/2041; H04B 1/7097
USPC ...................................................... 342/357.59
See application file for complete search history.

(56) References Cited

U.S. PATENT DOCUMENTS

| | | |
|---|---|---|
| 5,875,180 A | 2/1999 | Wiedeman et al. |
| 6,023,463 A | 2/2000 | Wiedeman et al. |
| 6,118,767 A | 9/2000 | Shen et al. |
| 6,125,260 A | 9/2000 | Wiedeman et al. |
| 6,400,927 B1 | 6/2002 | Daniel et al. |
| 6,628,921 B1 | 9/2003 | Vaddiparty et al. |
| 7,525,481 B2 * | 4/2009 | Leinonen ................ G01S 19/21 |
| | | 455/302 |

(Continued)

OTHER PUBLICATIONS

International Search Report and Written Opinion dated Nov. 4, 2017 by the International Searching Authority (European Patent Office) in PCT Application PCT/US2017/037800.

*Primary Examiner* — Chuong P Nguyen
(74) *Attorney, Agent, or Firm* — NovoTechIP International PLLC

(57) ABSTRACT

A receiver determines whether an outbound carrier frequency among a plurality of outbound carrier frequencies, as received, includes interference. Based at least in part on a result of the determining, a new outbound carrier frequency is selected for the receiver. Optionally, the receiver sends an interference report to a system controller.

13 Claims, 6 Drawing Sheets

(56) References Cited

U.S. PATENT DOCUMENTS

| | | | |
|---|---|---|---|
| 8,107,875 B2 | 1/2012 | Miller | |
| 8,213,874 B2 | 7/2012 | Agnew | |
| 8,238,410 B2 * | 8/2012 | Lennen | H04B 1/71 375/348 |
| 8,654,719 B2 | 2/2014 | Hamalainen et al. | |
| 8,862,060 B2 | 10/2014 | Mayor et al. | |
| 9,654,158 B2 * | 5/2017 | Dafesh | H04B 1/719 |
| 9,887,717 B2 * | 2/2018 | Cyzs | H04J 11/0066 |
| 10,178,679 B2 | 1/2019 | Yang et al. | |
| 10,281,556 B2 * | 5/2019 | Mahmood | H04B 17/318 |
| 11,133,838 B2 * | 9/2021 | Dafesh | H04B 1/1036 |
| 11,165,455 B2 * | 11/2021 | Gustavsson | H04B 1/525 |
| 11,424,777 B2 * | 8/2022 | Cyzs | H04B 7/0854 |
| 2002/0044614 A1 | 4/2002 | Molnar et al. | |
| 2003/0073435 A1 | 4/2003 | Thompson et al. | |
| 2015/0116145 A1 | 4/2015 | Ashjaee | |
| 2015/0381221 A1 * | 12/2015 | Cyzs | H04B 7/086 375/346 |
| 2021/0389474 A1 * | 12/2021 | Hamzeh | H04J 11/0023 |

\* cited by examiner

APPARATUS AND METHODS FOR INTERFERENCE MITIGATION BY SATELLITE NETWORKS

CROSS REFERENCE TO RELATED APPLICATION

This application is a divisional application of U.S. patent application Ser. No. 15/624,619, entitled "APPARATUS AND METHODS FOR INTERFERENCE MITIGATION BY SATELLITE NETWORKS" filed Jun. 15, 2017, which is incorporated by reference herein in its entirety, which claims the benefit of U.S. Provisional Patent Application No. 62/350,671, entitled "APPARATUS AND METHODS FOR INTERFERENCE MITIGATION BY SATELLITE NETWORKS" filed Jun. 15, 2016, which is incorporated by reference herein in its entirety, and claims the benefit of priority from U.S. Provisional Patent Application Ser. No. 62/351,720 filed Jun. 17, 2016, entitled "APPARATUS AND METHODS FOR INTERFERENCE MITIGATION BY SATELLITE NETWORKS," which is incorporated by reference herein in its entirety.

BACKGROUND

Ground terminal reception of downlink transmissions from satellites can incur interference from various sources. Reasons include sharing of microwave frequency bands with other microwave communications. For example, terrestrial tower-to-tower microwave links can operate in the same microwave frequency bands as the satellites. Even though terrestrial microwave and satellite networks can utilize directional antennas, the terrestrial microwave antennas can exhibit side-lobe radiation that can cause interference to the downlink receive path of a satellite terminal. Adjacent satellites can also cause interference. To reduce such interference, frequencies can be allocated according to geographic regions, or boundaries of satellite spot beams.

Notwithstanding such allocation, weather patterns can degrade the propagation path between a transmitter and one or more of its intended receivers, without degrading the path from the transmitter to an unintended receiver. Also, a transmitter antenna can become misaligned, due to mechanical failure or other causes, resulting in its signal power being received at locations outside the antenna's intended coverage area. Some of these events can be difficult or impractical to detect, at least in real time. For example, the degradation may be transient, and may be experienced by only a small number of the receivers.

SUMMARY

This Summary identifies example features and aspects that are disclosed, and is not an exclusive or exhaustive description of the disclosed subject matter. Whether features or aspects are included in, or omitted from this Summary is not intended as indicative of relative importance of such features. Additional features and aspects are described, and others will become apparent to persons skilled in the art upon reading the following detailed description and viewing the drawings that form a part thereof.

One or more disclosed methods can provide for interference mitigation, and exemplary processes can include determining at a receiver within a coverage area of a multiple carrier frequency transmitter, an interference metric for a received outbound carrier frequency, among a plurality of outbound carrier frequencies; communicating the interference metric from the receiver to a system controller; and developing, by the system controller, an interference map based at least in part on the interference metric.

In one or more implementations, the outbound carrier frequency can include acquisition symbols, and determining whether the outbound carrier frequency, among the plurality of outbound carrier frequencies, as received, has interference includes detecting errors in a reception of the acquisition symbols, and calculating a quality measurement based, at least in part, on a result of the detecting errors. Also, in one or more implementations, determining whether the outbound carrier frequency, among the plurality of outbound carrier frequencies, as received, has interference can include comparing the quality measurement to a threshold. In an aspect, calculating the quality measurement can be configured to calculate the quality measurement as a value indicative of a ratio of energy-per-symbol of the acquisition symbols to noise power spectral density of the acquisition symbols.

In one aspect, the multiple carrier frequency transmitter can include a satellite. In another aspect, the system controller can be a satellite gateway to the satellite. In another aspect, the receiver can be a first receiver and the interference metric for the carrier frequency can be a first receiver interference metric for the received outbound carrier frequency. In an aspect, operations of processes in one or more disclosed methods can also include determining at a second receiver, within the coverage area of the multiple carrier frequency transmitter, a second receiver interference metric for the outbound carrier frequency; and communicating the second receiver interference metric from the second receiver to the system controller. In an aspect, developing, by the system controller, of the interference map can be further based at least in part on the second receiver interference metric. Operations of processes in one or more disclosed methods can also include establishing or adjusting, at the system controller, a frequency plan for assigning each of a plurality of outbound carrier to an outbound carrier frequency among the plurality of outbound carrier frequencies, based at least in part on the interference map. In an aspect, the first receiver can be associated with a first terminal and the second receiver can be associated with a second terminal. Operations in processes in one or more of such methods can include assigning the first terminal and the second terminal to terminals to corresponding outbound carrier frequencies among the plurality of outbound carrier frequencies, based at least in part on the interference map. Operations in processes in one or more disclosed methods can also include establishing by the system controller of installation quality threshold objectives, based at least in part on the interference map.

Another example among disclosed methods can also provide for interference mitigation, and operations in its processes can include determining at a receiver whether an outbound carrier frequency, among a plurality of outbound carrier frequencies, includes interference; and based at least in part on a result of the determining, selecting as a communication carrier frequency for the receiver a new carrier frequency among the plurality of carrier frequencies.

In processes of one example among disclosed methods, the outbound carrier frequency can be a currently selected carrier frequency among the plurality of outbound carrier frequencies, and the selecting can include selecting a candidate new carrier frequency among the plurality of outbound carrier frequencies; determining whether the candidate new carrier frequency includes interference; and upon the determining the candidate new carrier frequency does not include interference, setting the candidate new carrier frequency as the new outbound carrier frequency. In an aspect, based at least in part on a first result of the determining, the selecting can maintain the currently selected outbound carrier frequency and, based at least in part on a second result of the determining, the selecting can include updating the selected outbound carrier frequency to another outbound carrier frequency among the plurality of outbound carrier frequencies. In processes of one example among disclosed methods, updating the selected outbound carrier frequency to another outbound carrier frequency can include tuning the receiver to the other outbound carrier frequency, and transmitting from the receiver a carrier frequency update information that identifies the other outbound carrier frequency.

In an aspect, the communication signal, at least while the carrier frequency communication is the currently selected outbound carrier frequency, can include active periods and idle periods, and determining whether the received carrier frequency includes interference can be performed during the idle periods.

Examples among disclosed apparatuses include a terminal having a processor configured to determine whether a received outbound carrier frequency, among a plurality of outbound carrier frequencies, includes interference and, based at least in part on a result of the determining, to select as an outbound carrier frequency for the receiver a new outbound carrier frequency among the plurality of outbound carrier frequencies.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Figure 1:
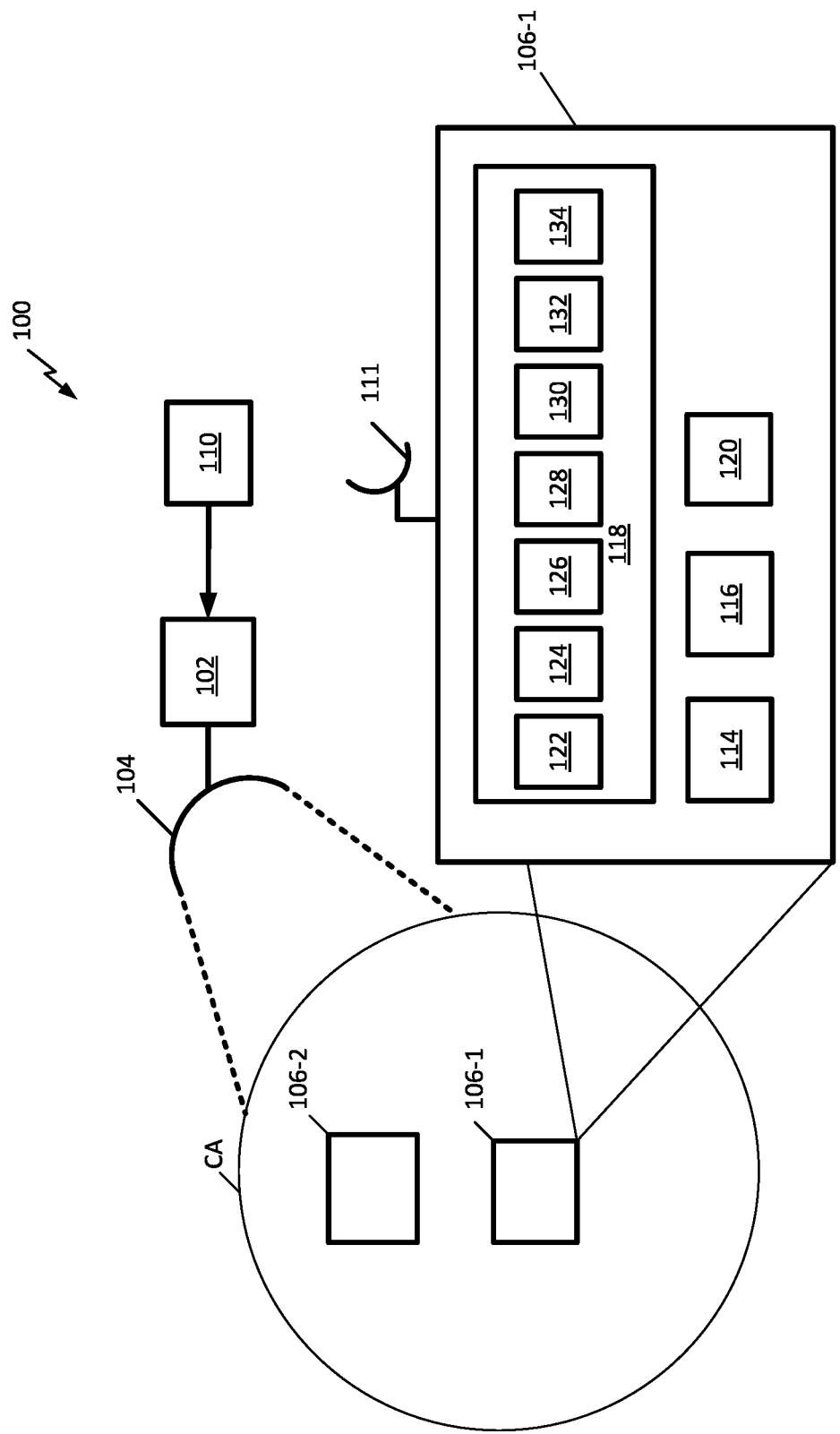
FIG. 1 illustrates one example system featuring adaptive interference mitigation according to various aspects.

FIG. 1 illustrates one system 100 providing, in addition to conventional wireless communication and distribution of signals to end users over a given geographical area, adaptive interference mitigation according to various aspects. Conventional wireless distribution aspects of the system 100 can be according to a wide range of conventional architectures and protocols. Examples are described in greater detail later in this disclosure. In one implementation, system 100 can include a multiple carrier frequency transmitter resource 102 feeding a system antenna 104, configured to distribute signals on any among N different outbound carrier frequencies, which can be referenced as FC(n), for n ranging from 1 to N. It will be understood that the FIG. 1 block labeled and described as the multiple carrier frequency transmitter resource 102 is not necessarily a single hardware device. For example, implementations of the multiple carrier frequency transmitter resource 102 can include one satellite with multiple transponders, or multiple satellites each having multiple transponders. Implementations can also include, alternative to or additional to the above-described examples, one or more other elevated-platform transponders or other elevated devices capable of transmitting and assigning multiple carrier frequencies. In various implementations, the multiple carrier frequency transmitter resource 102 and system antenna 104 can be configured to provide a coverage area, labeled "CA" in FIG. 1. The meaning of "coverage area," in this context, can be a geographical area in which any outbound carrier frequency FC(n) intentionally radiated from the system antenna 104 will, with a given acceptable probability, be received with an acceptable quality—absent interference and/or severe weather.

Referring to FIG. 1, the system 100 can include a population of receiver terminals distributed over the coverage area CA, each configured to provide local interference detection and a range of adaptive interference mitigation features according to various aspects disclosed herein. FIG. 1 shows a representative set of two of such receiver terminals which will be referenced, for purposes of description, as "first interference scanning user terminal 106-1" and "second interference scanning user terminal 106-2." The first interference scanning user terminal 106-1 and second interference scanning user terminal 106-2 will be referenced collectively as "interference scanning user terminals 106." The illustrated population of two interference scanning user terminals 106 is only for purposes of describing example features and illustrative operations thereof. Systems configured with local interference detection and adaptive interference mitigation as described in reference to system 100 can include hundreds or thousands of interference scanning user terminals 106. It will also be understood that the interference scanning user terminals 106 are not necessarily identically structured.

Implementations of system 100 can include functionality and general architecture according to various conventional satellite communication systems, combined with local interference detection and adaptive interference mitigation features as describe herein. For example, implementations can include functionality and general architecture of a conventional satellite communication system having one or more hubs, a population of Very Small Aperture Terminals (VSAT), one or more satellites, and a satellite control facility. Implementations can also include or adapt a VSAT system such as illustrated in FIG. 1 of U.S. Pat. App. Pub. No. 2016/003651, filed Oct. 12, 2015, the entirety of which is hereby incorporated by reference. Another example can include or adapt a VSAT system such as illustrated in FIG. 1B of U.S. Pat. App. Pub. No. US20160094467, filed Sep. 25, 2015, the entirety of which is hereby incorporated by reference. Another example can include or adapt a VSAT system such as illustrated in FIG. 1 of U.S. Pat. App. Pub. No. 2014/0169167, filed Feb. 21, 2014, the entirety of which is hereby incorporated by reference. It will be understood that these are only examples within a larger range of VSAT architectures and configurations that can be included and/or adapted to implement the system 100.

In implementations of system 100 that include and/or adapt VSAT architecture and features as illustrated by the above-examples, their respective VSAT terminals can be adapted, modified and/or further configured with local interference detection and adaptive interference mitigation features as described herein to implement the interference scanning user terminals 106. Example adaptation, modification and/or further configuration can include particularly configured machine-executable code, added processor resources, or both. The respective hubs and satellite(s) of the above-identified examples can be modified, adapted and further configured to interface and inter-operate with terminals such as the described interference scanning user terminals 106, to implement the multiple carrier frequency transmitter resource 102 and system antenna 104. Example adaptation, modification and/or further configuration can include particularly configured machine-executable code, added processor resources, or both.

Referring to FIG. 1, coupled to the multiple carrier frequency transmitter resource 102 can be a system controller 110. The system controller 110 can be configured to include a carrier frequency assignment feature (not separately labeled in FIG. 1). The system controller 110 can be configured to assign any signal onto any outbound carrier frequency of the multiple carrier frequency transmitter resource 102, for distribution to interference scanning user terminals 106 within the coverage area CA. Such signals can be provided to the multiple carrier frequency transmitter resource 102 by conventional techniques that are not necessarily specific to the disclosed interference detection and mitigation aspects. In one or more implementations of system 100 such as identified above, adapting and including conventional VSAT architecture and functionality, the system controller 110 carrier frequency assignment features can be implemented, for example, by modifying, adapting and/or further configuring one or more VSAT satellite gateways (not explicitly visible in FIG. 1). Example adaptation, modification and/or further configuration can include particularly configured machine-executable code, added processor resources, or both.

Regarding configuration of the interference scanning user terminals 106, FIG. 1 shows a representative configuration of the first interference scanning user terminal 106-1 that can include a terminal receiver antenna 111, a carrier frequency step tuner 114, a demodulator/decoder 116, an interference analyzer 118, and a terminal controller 120. Configurations of the terminal receiver antenna 111, carrier frequency step tuner 114, and demodulator/decoder 116 are not necessarily specific to disclosed aspects. For example, in the identified example implementation of system 100 that includes and/or adapts features of a conventional VSAT terminal, the terminal receiver antenna 111 may be a conventional VSAT terminal dish. Assuming the FC(n) bandwidth and spacing conforms to, or is comparable to conventional VSAT standards, the carrier signal step tuner 114 can be configured to step frequencies with a corresponding granularity. The demodulator/decoder 116 can be a conventional phase-shift keying (PSK), for example, and without limitation, quadrature PSK (QPSK), 8PSK, 16-APSK, 32-APSK, and so forth. In an aspect, the interference scanning user terminals 106 may be configured with error detection (not explicitly visible in FIG. 1), for example, a conventional parity or cyclic redundancy code (CRC). The interference scanning user terminals 106 can also be configured with forward error correction. Error detection and forward error correction may be included, for example, as functionalities of the demodulator/decoder 116. Persons of ordinary skill are knowledgeable of such error detection and correction techniques. Therefore, for brevity, further detailed description is omitted.

Referring to FIG. 1, aspects of the interference analyzer 118 will be described. In one aspect, the interference analyzer 118 can be configured to include a received carrier frequency quality measurement module 122, a received carrier frequency interference detecting module 124, and a local interference mitigation module 126. The received carrier frequency quality measurement module 122 can be configured to measure signal quality level of any of the N outbound carrier frequencies FC(n), as received at the scanning receiver terminal 106. Implementations of the received carrier frequency quality measurement module 122 can be configured to measure the signal quality using, for example, an output of the demodulator/decoder 120 corresponding to acquisition symbols carried by each of the outbound carrier frequencies FC(n). The acquisition symbols on each of the N outbound carrier frequencies can be transmitted with timing and other protocol according to conventional acquisition symbol techniques. Also according conventional acquisition symbol techniques, each of the scanning receiver terminals 106 can be provided—a priori—sufficient parameters (for example, acquisition symbol code(s) and timing) of the acquisition symbols, at least for all outbound carrier frequencies FC(n) available to, or potentially available to that scanning receiver terminal 106.

In an aspect, the interference analyzer 118 of each scanning receiver terminal 106 can be configured to use errors, in the decoding by that scanning receiver terminal 106 of acquisition symbols for any of the outbound carrier frequencies FC(n), to measure the signal quality of that outbound carrier frequency. In example implementations, the interference analyzer 118 can be configured to perform the measuring by calculating a mean square error in the received acquisition symbols, at the scanning receiver terminal 106 location, and then converting the calculated mean square error into a representation of the ratio of energy per symbol (Es) to noise power spectral energy (No), or "Es/No." The converting may include converting the calculated mean square error into Es/No, in terms of decibels (dB), using, for example, a logarithmic scaling function. In an aspect, the interference analyzer 118 can be configured to include an averaging of the mean square error over acquisition symbols, and then using the average as the value to be converted into a dB measure of Es/No. Implementations can also use the dB of "energy-per-bit" or "Eb" to "No," i.e., "Eb/No," instead of Es/No. The arithmetic relation of Eb/No to Es/No, as known to persons of ordinary skill, is based on bits/symbol and further description is therefore omitted.

In one or more implementations, the interference analyzer 118 can be configured with capability of detecting, based on the calculated Es/No of any outbound carrier frequency FC(n), whether that outbound carrier frequency FC(n)—as received—includes interference. For example, the interference analyzer 118 can be configured with, or provided with, thresholds, as will be described in greater detail later in this disclosure. Also in one or more implementations, the interference analyzer 118 can be configured with capability to report its detection of interference, or to report its calculated Es/No or equivalent in any outbound carrier frequency FC(n), or both, to system controller resource, for example, the system controller 110.

In one or more implementations, the interference analyzer 118—alone or in combination with other resources of the scanning user terminals 106—can be configured to perform various modes of local interference mitigation, based at least in part on detection of interference—at the scanning user terminals 106. For example, modes of local interference mitigation can include initial selection, at the scanning user terminals 106, of outbound carrier frequency FC(n). In another aspect, modes of local interference mitigation can include changing from a currently assigned outbound carrier frequency, for example FC(a), to another outbound carrier frequency, for example FC(b), based at least on part on detection of interference in FC(a). In one or more alternative or additional implementations, the system controller 110 or another system resource can be configured to perform central interference mitigation, based for example on reports of detected interference received from the analyzer(s) 118 of one or more among the scanning user terminals 106.

In an aspect, the interference analyzer 118 can be configured with capability of measuring a power spectrum on any of the outbound carrier frequencies FC(n). In an aspect, the interference analyzer 118 can be configured with capability of detecting, based on measuring a power spectrum on any of the outbound carrier frequencies FC(n), whether FC(n) includes interference. One or more implementations of the interference analyzer 118 capability to determine power spectrum can include a band-pass filtering equivalent to a bank of Q sub-band filters (not explicitly visible in FIG. 1), each having a bandwidth of approximately 1/Q of the bandwidth of the outbound carrier frequency FC(n). Example implementations of "bank of Q sub-band filters" can include, without limitation, a Q-point FFT. For example, the interference analyzer 118 can be configured to include a sampling filter 128 feeding an analog to digital (A/D) converter 130 that, in turn, feeds a Fast Fourier Transform (FFT) module 132. The FFT module 124 can feed a power spectrum based interference detector 134. The power spectrum based interference detector 134 can be configured to detect interference (or absence of interference), for example, by comparing output of the FFT module 132 to one or more interference templates (not separately visible in FIG. 1). In an aspect, the FFT module 132 can be configured as a Q-point FFT, providing Q frequency bins. The number of points in the FFT can be referred to as the "size" of the FFT. In another aspect, the FFT module 132 can be configured as an MO-point FFT, M being an integer greater than or equal to integer two. In such a configuration, each of the Q sub-band filters can be implemented as a combination of multiple (for example, "M") adjacent FFT cells or bins. The value of Q (and of MQ) can be application-specific, but can be determined by persons of ordinary skill upon reading this disclosure, for specific applications, without undue experimentation. The interference analyzer 118 can be configured such that Q can be varied, for example, by command from the system controller 110.

It will be understood that the FIG. 1 block representing the interference analyzer 118 represents functional aspects, not necessarily a discrete hardware item. For example, the interference analyzer 118 can be implemented as a functionality of the terminal controller 120. The received carrier frequency quality measurement module 122, quality measurement based interference detecting module 124, and local interference mitigation module 126 can be implemented, for example, as computer-executable instructions stored in a memory coupled to one or programmable processors in the terminal controller 120. Likewise, in implementations that include sampling filter 128, FFT module 132, and power spectrum based interference detector 134, one or more of these features can be implemented, for example, as computer-executable instructions stored in a memory coupled to one or more programmable processors in the terminal controller 120.

Additionally, or alternatively, the interference analyzer 118 can be implemented as a distributed resource, with certain functionality provided by resources local to the user terminals 106 and other functionality provided by resources remote from the user terminals 106. As illustration, in one implementation, the terminal controller 120 of the user terminals 106 may receive carrier frequency interference measurement instructions (not explicitly visible in FIG. 1) from the system controller 110. The carrier frequency interference measurement instructions, in an aspect, can be addressed to a specific one of the user terminals. The carrier frequency interference measurement instructions, in another aspect, can be addressed to all of the user terminals 106, or to a sub-set of the user terminals 106. The carrier frequency interference measurement instructions may instruct the addressee user terminal(s) 106 to perform interference measurement on a particular Rth one of the outbound carrier frequencies FC(n). The terminal controller 120 of the user terminals 106 can be configured to respond to such instructions by controlling the carrier frequency step tuner 114 to step to FC(R), and then control the interference analyzer 118 to measure the outbound carrier frequency FC(R) quality and, optionally, determine the interference as described above.

In one or more example implementations, the carrier frequency interference measurement instructions can include instruction to send to the system controller 110 the set of quality measurements, for example, as an interference measurement report. The quality measurements may be Es/No (e.g., in dB) of FC(R). The quality measurements may, additionally or alternatively, be the power spectrum of FC(R). It will be understood that implementations of the interference analyzer 118 can be limited to operation in this measurement-only mode, for example, by omitting a capability of detecting presence (or absence) of interference from dB Es/No value, or from the set of Q sub-band power measurements. In one or more alternative implementations, the interference analyzer 118 can be configured with a capability of detecting presence (or absence) of interference in FC(R) based, for example, on dB Es/No, the power spectrum of FC(R). The carrier frequency interference measurement instructions can include fields (not visible in FIG. 1) instructing the interference analyzer 118 to detect interference locally, or to send the system controller 110 the quality measurements of FC(R) (for example, dB Es/No, or Q total power measurements). Regarding scheduling the interference analyzer 118, the interference analyzer 118 can be configured (for example, by command) to not interrupt, at least noticeably, a particular communication by or utilizing the user terminal 106.

In an aspect, the interference analyzer 118 may be configured (for example, by instructions) to perform a repeated loop of measuring the quality of the currently selected outbound carrier frequency until interference is detected. Depending on the specific computational resources in or available to the interference analyzer 118, such measurement may be performed without unacceptable disruption of operations, for example, ongoing communications through the user terminal 106. Persons of ordinary skill, having possession of this disclosure, can determine such required computational resources, for a specific application, without undue experimentation.

In an aspect, the interference analyzer 118 can be configured (or controlled) to exit the above-described loop upon detection of interference in the current carrier frequency. In one or more implementations, operations of the interference analyzer 118 can then include sending an interference report (not explicitly visible in FIG. 1) to the system controller 110. Also, in one or implementations, the interference analyzer 118 may then temporarily override the user's selection of the current carrier frequency and switch the carrier frequency step tuner 114 to another of the N outbound carrier frequencies FC(n). This other carrier frequency can be a "candidate" new carrier frequency. In one or more implementations, identifying the candidate new carrier frequency can be according to a default candidate selection order. The default candidate selection order, for example, can be programmed into the terminal controller 120, or into the interference analyzer 118, or both. In an additional, or alternative implementation, the system controller can 110 can be configured to update the selection order, for example, in response to a triggering event, or periodically. In another alternative, or additional implementation, the system controller 110 can be configured to update one or more of the interference scanning user terminals 106, or specific sub-sets of the interference scanning user terminals 106 with one updated candidate selection order, and to update another one or more of the interference scanning user terminals 106 with another candidate selection order.

Continuing with the above example, in one implementation the interference analyzer 118, upon detecting no interference in the candidate new outbound carrier frequency, may initiate communication of a carrier frequency change request (not explicitly visible in FIG. 1) to the system controller 110. In one implementation, the terminal controller 120, or the interference analyzer 118 may then enter a wait state, maintaining the current outbound carrier frequency selection, until receiving a carrier frequency change grant (not explicitly visible in FIG. 1) from the system controller 110. Example protocols for, and operations in the communication of the interference report, the carrier frequency change request toward the system controller 110, and of the frequency change grant from the system controller 110 to the user terminal(s) 106 can be application-specific. For example, in a scenario where the system 100 is implemented as part of a VSAT system, the interference report and the carrier frequency change request can be communicated over a reverse uplink (not explicitly visible in FIG. 1) transmission from the user terminal 106 to the satellite, followed by a reverse downlink transmission (not explicitly visible in FIG. 1), from the satellite to the system controller 110.

Figure 2:
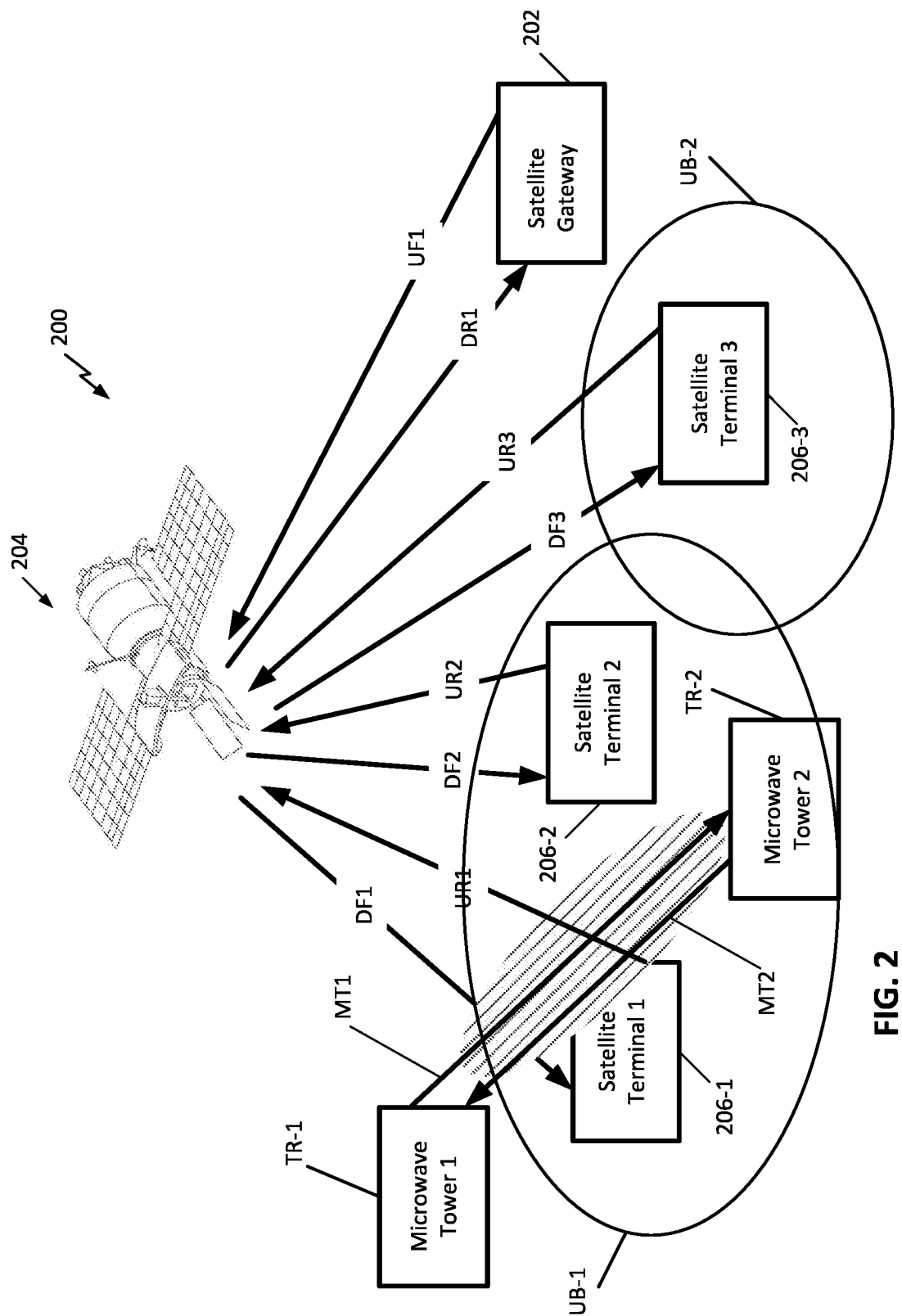
FIG. 2 illustrates one example satellite communication system featuring adaptive mitigation according to various aspects.

FIG. 2 illustrates a satellite communication system (SCS) 200, featuring adaptive interference mitigation according to various aspects. Referring to FIG. 2, SCS 200 can include satellite gateway 202, satellite 204, first satellite terminal 206-1, second satellite terminal 206-2, and third satellite terminal 206-3. The satellite 204 can include two or more transponders (not separately visible in FIG. 2), with one or more transmitting first user beam UB-1, and one or more transmitting second beam UB-2. The first satellite terminal 206-1 and second satellite terminal 206-2 are shown within the first user beam UB-1, and the third satellite terminal 206-3 is shown within the second user beam UB-2. For purposes of description, the first satellite terminal 206-1, second satellite terminal 206-2, and third satellite terminal 206-3 will be collectively referenced as "satellite terminals 206." As illustration of an interference, a first microwave tower TR-1 and a second microwave tower TR-2 (collectively "microwave towers TR"), with associated microwave links MT-1 and MT-2 (collectively "microwave links MT"), are shown as example interference sources.

In an aspect, each of the satellite terminals 206 can be configured to perform interference measurement, detection, or both, according to one or more schedules. Interference measurement operations can be performed, for example, according to any of the above-described implementations of the bank of Q sub-band filters. In an aspect, the satellite terminals 206 can be configured to perform interference measurement, detection, or both, at different times within their respective life cycles. For example, one or more of the satellite terminals 206 can be configured to perform interference measurement when initially installed at a customer premise. Alternatively, or additionally, one or more of the satellite terminals 206 can be configured to perform interference measurement in response to certain trigger events, or during defined periods. In an aspect, one or more of the satellite terminals 206 can be configured to perform interference measurement during extended long periods, for example, during normal operations as a network access point.

Exemplary implementations of the above-described configurations of the satellite terminals 206 can include computer-executable instructions, computer hardware, or combinations thereof, arranged to automatically detect interference during the course of the satellite terminal 206 active normal communications. The computer-executable instructions, hardware, or both can be configured to scan a single frequency or all of the frequencies that span its available frequency range for communication. In an aspect, the computer-executable instructions, hardware, or both can be configured such that the satellite terminal 206 performs a two-level scan. The first level can include tuning to a specific frequency such as the center frequency of a specific one of the downlink carriers, and then measuring its Es/No power level. The first level can include scanning a sequence of each of the center downlink frequencies for each of the available downlink carriers. The second level can include a characterization of interference (or absence of interference) by sampling the total power levels, in dBm, in each of a plurality of sub-bands. The second level can include, for example, the Q sub-bands described in reference to FIG. 1. The second level characterization can start, for example, at the lowest frequency in a given frequency range up to the highest frequency in that range in small fixed increments.

The satellite terminals 206 can be configured (statically or selectively by control input), to perform scanning of each frequency immediately after one another to allow comparison between the power levels even during weather events. This can exploit a general tendency of current weather similarly impacting all frequencies (within the frequency span of interest) during very short windows of time. The satellite terminals 206 can be configured (statically or by control input) to perform scanning within idle periods such as occur during normal user communications. Additionally, the satellite terminals 206 can be configured (statically or selectively by control input) to perform scanning according to a schedule that avoids times when the user is actively communicating by the satellite terminal. In an aspect, the satellite gateway 202 or other network management system (not explicitly visible in FIG. 2) may be configured to direct individual satellite terminals 206, or a subset of satellite terminals 206, via the satellite network to perform scans on an on-demand basis. In one or implementations the "on-demand" scans can include the satellite terminal(s) determining the terminals' current ability to perform the scan. In another one or more implementations, the satellite gateway 202 or other network management system can configure each satellite terminal 202 with a schedule or periodic frequency or trigger of when that satellite terminal 206 can attempt to scan each given available frequency. In another one or more implementations, the satellite gateway 202 or other network management system may be configured to selectively command one or more individual satellite terminals to initiate a scan. In addition, one or more of the satellite terminals 206 can be configured to detect, as a triggering event, a change of the satellite terminal 206 list of available frequencies change or update to its embedded software.

FIG. 2 shows the microwave towers TR and associated microwave links MT as interference sources. It will be understood that these are only for purposes of example, and that adaptive interference mitigation according to disclosed aspects can reduce downlink interference from other sources, such as other satellites and other high altitude platforms, as well as various other sources.

As illustrated by the microwave towers TR and associated microwave links MT, terrestrial interference can be sparse and located in geographically limited areas within the satellite network footprint. For example, the microwave towers TR and associated microwave links MT only interfere with the first satellite terminal 206-1. The interference, in this example, may not be directly detectable at the satellite gateway 202. The interference, in this example, may not be directly detectable at the second satellite terminals 206-2, or at the third satellite terminal 206-3. It will therefore be understood that interference detection by the satellite terminals 206, as provided by adaptive interference mitigation according to disclosed concepts, provides the system 200 with the capability of detecting such localized interference.

In one or implementations of the system 200, interference reports from individual satellite terminals 206 can be collected, for example, by the satellite gateway 202 or another system controller resource and used, for example, to generate a system-wide map of localized interference. The map of localized interference can include time aspects, including statistical periodicity of certain interference. In an aspect, the satellite gateway 202 or another system controller resource can be configured to share this interference map information, for example, with transportable or mobile satellite terminals such as affixed to land vehicles. The information can include expected interference level. Based on such information, the satellite gateway 202 or another system controller resource can provide such transportable or mobile satellite terminals with suggested frequency carrier frequencies, so that the mobile terminals, or the system 200, or both, can pre-compensate as the mobile terminals move.

In an aspect, the satellite terminals 206 can be configured (statically or selectively by control input) such that upon detecting a decrease of measured all downlink carrier power levels below a configured threshold, compared to previous scanned power levels, the scan can be ignored. Such a decrease of all downlink carrier power levels may result, for example, from severe weather events or other factors. Similarly, the satellite terminals 206 can be configured or controlled to compare the downlink carrier power level across all of the scanned downlink carriers to establish confidence that a particular downlink carrier is being interfered with. All scanned downlink carrier power levels being below the configured threshold may indicate, for example, that the satellite terminal 206 antenna is misaligned, or there is severe weather at the satellite terminal 206 or satellite gateway 202 locations. All scanned downlink carrier power levels being below the configured threshold can also indicate, for example, existence of interference to all downlink carriers.

In one or more implementations, the satellite terminals 206 can be configured, statically or by control input, to report scanned power levels as part of their respective installation and commissioning. In an aspect, the satellite terminals 206 can be configured, statically or by control input, to report scanned power levels for use by an installation verification tool to verify the quality of the satellite terminal installation. If the quality is not sufficient the terminal installation can be rejected. Additionally, if the quality is not sufficient, the installer may be requested to redo the installation until sufficient quality level is achieved. Also, by including interference scanning metrics in a quality level, the SCS 200 can provide information that can distinguish poor performance due to poor antenna pointing from poor performance due to interference, even with proper antenna pointing.

The SCS 200 can be configured, in an aspect, to assign outbound carrier frequencies as "secondary allocations." A "secondary allocation" of an outbound carrier frequency is conditional upon non-use of that outbound carrier frequency, or of a frequency range that includes that outbound carrier frequency by an assigned primary user. In an aspect, the SCS 200 may be required to cease all transmissions in a given outbound carrier frequency upon detecting transmissions in that outbound carrier frequency from a primary use system. One or implementations of the SCS 200 can accommodate such cessation by configuring the satellite terminals 206 to immediately report the detection of a primary user, for example, to the satellite gateway 202 or to another central control resource. The reporting, according to one example implementation, can be on a non-secondary frequency. In an aspect, the satellite gateway 202 or other central control resource can be configured to respond by immediately ceasing using the given frequency within the identified region. Alternatively, or additionally, the satellite gateway 202 or other central control resource can be configured to adjust the downlink carrier bandwidth and center frequency if the primary user interference is detected in only part of the carrier frequency range.

In one implementation, one or more of the satellite terminals 206 can be configured to collect several samples at different times and then report all of the interference detection data, including time stamps, as a set. Also, one or more of the satellite terminals 206 can be configured, or controlled to selectively, or optionally suppress reporting or to report an "all clear" indication if no interference was detected during any of the interference collection scans. This feature can reduce or avoid reporting of unnecessary data over the satellite network.

The satellite gateway 202 or network management system can request a population of satellite terminals 206 to perform a scan, via unicast or multicast messages. For example, the request can be to a subset of satellite terminals 206 in a user beam, including but not limited to a set within a given geographic area. This request can be for one or more of the set or population of satellite terminals 206 to perform a scan, for example, at a scheduled time or to scan immediately if able (for example if idle). The requests can allow comparison of scans between satellite terminals on a time basis and geographic basis once the scanned data is reported for interference analysis.

In one or more implementations, interference analysis, characterization, and mapping can be provided at a central location, such as at the satellite gateway 202 or at another central network management resource of the SCS 200. Exemplary interference analysis, characterization, and mapping can include establishing and updating an overall database and/or interference map. The interference map can include, for example, aggregated data of the interference locations. The interference map can also include interference behavior patterns, based on analysis and deduction by the satellite gateway 202 or other central network management system of the SCS 200. This database or interference map can be geographic in nature, and may include dimensions such as frequencies, locations, metrics, and optionally time.

In various implementations, a central repository may be constructed based upon the collected and reported interference detection data from satellite terminals 206. The central repository may include aggregation of the data collected and reported into logical peer groups. The logical peer groups can be defined based upon installed satellite terminals in the same satellite beam for a given satellite, based upon the same geographic area or box within the satellite beam. The logical peer groups can be defined, additionally or alternatively, based upon a commonality of installed satellite hardware type or satellite terminal transmission capabilities, and/or the same frequencies and frequency range of its available downlink carrier frequencies. The geographic area of the peer group can define the granularity of the geographic size of the area where interference is declared to be detected or not detected for a given frequency within the given frequency range.

In one or more implementations, the SCS 200 can be configured to perform downlink interference mitigation that can include, among other features, using at each satellite terminal 206 site within a downlink beam only the portions of the downlink spectrum that meets performance objectives and regulatory requirements at that satellite terminal 206 site, and avoiding use of downlink spectrum that does not meet performance objectives and requirements at that satellite terminal 206 site. In addition, the SCS 200 can be configured to identify and avoid downlink spectrum that is pervasively interfered across the downlink beam. The SCS 200 can be configured to detect a pervasive interference based on interference reports or interference metric measurements from a plurality of the satellite terminals 206 within that downlink beam. In an aspect, the SCS 200 can be configured to perform the described interference mitigation locally at the satellite terminals 206 using data from their respective local interference scanning. In addition, such interference mitigation can be performed locally at the satellite terminals 206 using data provided by the network. One or more implementations of the SCS 200 can also configure the satellite gateway 202 or other network management system to perform such interference mitigation, using interference scan data collected from many satellite terminals 206 within the beam as well as from configured parameters, regulatory rules and other agreements. In an aspect, interference mitigation may be performed with a combination of control by the local satellite terminal 206 and by the satellite gateway 202 or other network control.

Implementations can include, for example, the satellite gateway 202 or other network control central system establishing baseline operational configurations, and the satellite terminals 206 acting autonomously to react to a change of condition (such as a new nearby interfering microwave tower going online). Additionally, local mitigation may be required during satellite terminal installation before the terminal is reachable by a central mitigation system. Furthermore, interference mitigation may be incorporated into terminal uplink power control algorithms.

A satellite terminal 206 capable of selecting from among two or more available downlink carriers may use interference data to make an appropriate choice that mitigates local interference. Such a choice may be made at installation, upon restart, due to relocation or mobility, to effect load balancing, to maintain availability in changing link conditions (such as weather), to optimize performance, upon gateway or network management or local command, or for other reasons not listed here. The available downlink carriers may be identified by a list or file sent by the satellite gateway or network management system, may be locally loaded or entered by the installer or user, or can be factory or depot loaded. The interference data source can be a scan by the satellite terminal 206. In addition, or alternatively, the interference data can be sent by the satellite gateway 202 or network management system. In an aspect, the interference data may be locally loaded or entered by the installer or user. In another aspect, the interference data may be factory or depot loaded.

Interference data may include entries or parameters derived from aggregation or analysis of interference scan results reported by other satellite terminals in the beam, as well as from regulatory coordination or other agreements. The satellite terminal can use the carrier list and interference data to avoid selecting a downlink carrier that is degraded beyond some fixed or configured threshold, or to optimize terminal performance or availability, or to optimize system capacity and carrier loading, as well as to comply with regulatory assignments and other agreements applicable to its current location. The satellite terminal 206 may be configured to use fixed, or configured or derived interference weighting. In an aspect, weightings can be arranged so that the satellite terminals 206 select, among a plurality of available outbound carrier frequencies, the one outbound carrier frequency that has less interference than other available outbound carrier frequencies. Weightings factors can be further configured such that the satellite terminals 206 can select outbound carrier frequencies that meet threshold requirements. Such implementations can provide, or assist in meeting one or more of load balancing, bandwidth management, availability, throughput, or other objectives. Weighting factors can also be configured to handle situations where an outbound carrier frequency that meets performance threshold requirements for a given satellite terminal 206 in clear sky might not provide satisfactory performance as compared to other available outbound carrier frequencies in case of subsequent rain attenuation. The rain attenuation or other such data can be stored as measured or configured interference data. The satellite terminals 206 can be configured to use such measured or configured interference data to reselect a downlink carrier in case of downlink signal quality change.

In implementations of SCS 200, a downlink assigning entity such as the satellite gateway 202 or other network management system can be configured with downlink assignment algorithms to assign satellite terminals 206 among available downlink carriers in view of particular objectives, for example, to provide load balancing, or to implement bandwidth agreements, or both. Such implementations can include configuring the algorithms so that the downlink assigning entity can use local interference scan data reported by the satellite terminals 206 to assist in meeting these objectives. The downlink assigning entity may be configured to also use, or alternatively use data derived from aggregation or analysis of interference scan data, for example, reported by some or all satellite terminals 206 in the beam or terminal local region. The downlink assigning entity may be configured to also use, or alternatively use rules from regulatory assignments and other use agreements applicable to the location of the particular satellite terminal. In such a case, the interference analysis and mapping output can be used to guide the terminal assignment to downlink carriers and other algorithms and operating parameters, using geographical and possibly interference time period data appropriate to each terminal location.

Based upon how widespread the analysis map determines the interference is within a given geographic area or across multiple geographic areas within a satellite beam, the downlink carrier plan may be changed to subdivide a frequency range into multiple downlink carriers so that at least one of those smaller carriers is free of interference or only minimally interfered in the given geographic area. This may be done to enable satisfactory performance for all satellite terminals 206 in the beam through at least one downlink carrier, as well as to comply with regulatory conditions and other agreements. The new configuration may automatically be determined by a frequency planning system that is part of or makes use of the collected interference map data from the reporting satellite terminals, or may be performed by an analyst. Note that although multiple smaller downlink carriers may provide lower statistical multiplexing gain, and thus lower aggregate capacity than one larger carrier of combined bandwidth, in a system providing dynamic adaptive coding and modulation (ACM) on the terminal downlink, the lesser interference of each subdivided carrier may enable enough terminals to operate at higher code rates than they would have on the interfered larger carrier so as to increase effective capacity. Thus, the frequency planning system may include traffic analysis combined with interference map data to maximize beam downlink capacity.

Interference mitigation according to disclosed concepts and aspects thereof can also be performed during satellite terminal installation or antenna pointing processes. The satellite terminal 206 can provide downlink signal quality feedback to the installer or antenna pointing system during the antenna pointing process. The satellite terminal 206, for example, can perform a frequency scan of preconfigured downlink frequencies applicable to its beam location to detect interference, and then priority sort available downlink frequencies based on interference impact to select a downlink frequency to lock onto for installation and commissioning with the satellite network. Alternatively, the satellite terminal 206 may not be preconfigured with downlink frequencies, and instead perform a frequency scan to locate and priority sort available downlink frequencies.

Interference mitigation according to disclosed concepts and aspects thereof may also be factored into satellite terminal uplink power control levels as a terminal changes from a less interfered downlink carrier to a more interfered carrier or vice versa. A satellite terminal 206, for example, may operate a closed uplink power control loop with the satellite gateway, adjusting its uplink transmit power upward or downward based on feedback from the gateway in order to stay within some operating range, so as to automatically compensate as changing weather introduces or reduces link impairments. The satellite terminal 206 may also or alternatively operate an open loop uplink power control offset based on the received downlink signal quality, interpreting a change in downlink signal quality as an indication of weather changes that would also affect the terminal uplink signal. In the event the satellite terminal 206 changes to a different downlink carrier autonomously or upon gateway or network management command, that downlink could provide a different signal quality due to interference. In this case, a satellite terminal 206 may use data from a local interference scan or as sent from the central system to normalize between downlink carriers so as to not inappropriately make uplink power level changes due to interference differences.

Disclosed systems and methods can provide, among other features, characterization of downlink interference at specific sites and across the coverage. Such features can provide, among other benefits, enablement of a satellite communication system to maximize system capacity across coverage while using shared downlink spectrum. Disclosed systems and methods can additionally provide, among other features and benefits, an optimizing of operation at each individual satellite terminal site in the presence of persistent or predictable interference in part of the downlink spectrum at that site, and detect and avoid satellite downlink interference into other communication systems with co-prime or secondary spectrum priority.

Disclosed systems and methods can provide, among other features, initial scan, periodic scan, and selective scan of a satellite system's allocated downlink frequency spectrum at some or all terminal sites. Such features can provide, among other benefits, to a system ability to identify and adapt operation at each site to local interference conditions, while maximizing satellite system capacity and performance by using interfered spectrum at those sites which are not interfered, or which while interfered can still provide adequate performance at a site of use. Information measured can include the downlink spectrum, the level of interference as measured by some receive signal quality metric, and may also include time periods of interference and respective levels. Based upon the collected and analyzed data, the satellite network either statically reconfigures its communication links to avoid these frequencies at affected sites, or dynamically avoids interfered frequencies at affected sites, and possibly only during periods of regular interference.

Figure 3:
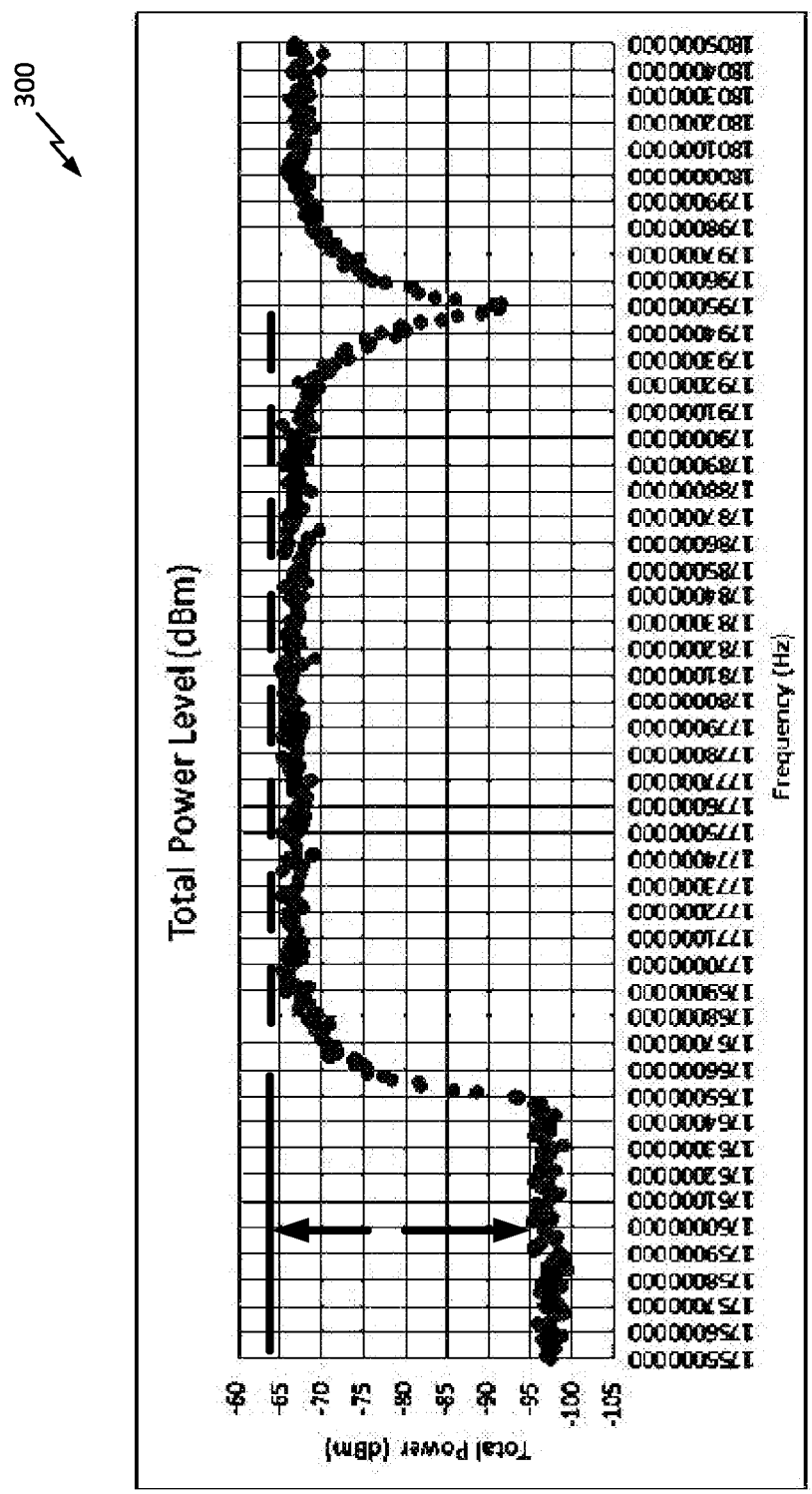
FIG. 3 graphically represents one simulated spectral profile generated by a computer performing a simulation of operations in a modeled scan process, using as input a hypothetical received non-interference spectrum at one modeled receiver location in a model of portions of one method for adaptive interference mitigation according to various aspects.

FIG. 3 graphically represents one simulated spectral profile 300 generated by a computer performing a simulation of operations in a modeled scan process, using as input a hypothetical received non-interference spectrum at one modeled receiver location (for example, the location of the FIG. 2 third satellite terminal 206-3) in a model of portions of one method for adaptive interference mitigation according to various aspects.

Figure 4:
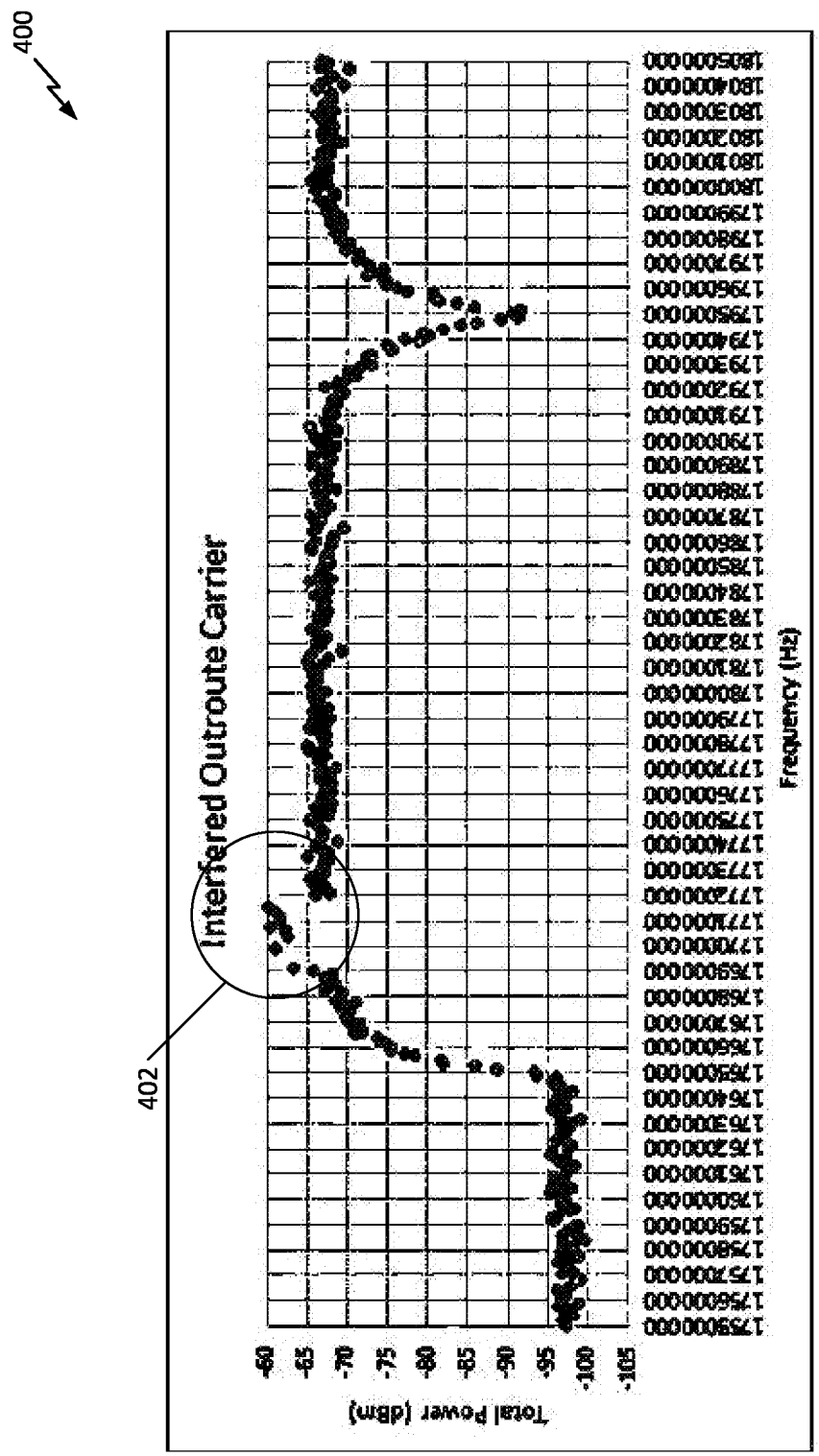
FIG. 4 graphically represents one simulated spectral profile generated by a computer performing a simulation of operations in a modeled scan process, using as input a hypothetical received interference spectrum at one modeled receiver location in a model of portions of one method for adaptive interference mitigation according to various aspects.

FIG. 4 graphically represents one simulated spectral profile 400 generated by a computer performing a simulation of operations in a modeled scan process, using as input a hypothetical received interference spectrum at one modeled receiver location (for example the location of the FIG. 2 first satellite terminal 206-1) in a model of portions of one method for adaptive interference mitigation according to various aspects. Referring to FIG. 4, region 402 shows one simulated example of narrowband interference. The simulation region 402 illustrates one kind of local interference, such as produced at the first satellite terminal 206-1 in FIG. 2, by the microwave links MT between the microwave towers TR.

Figure 5:
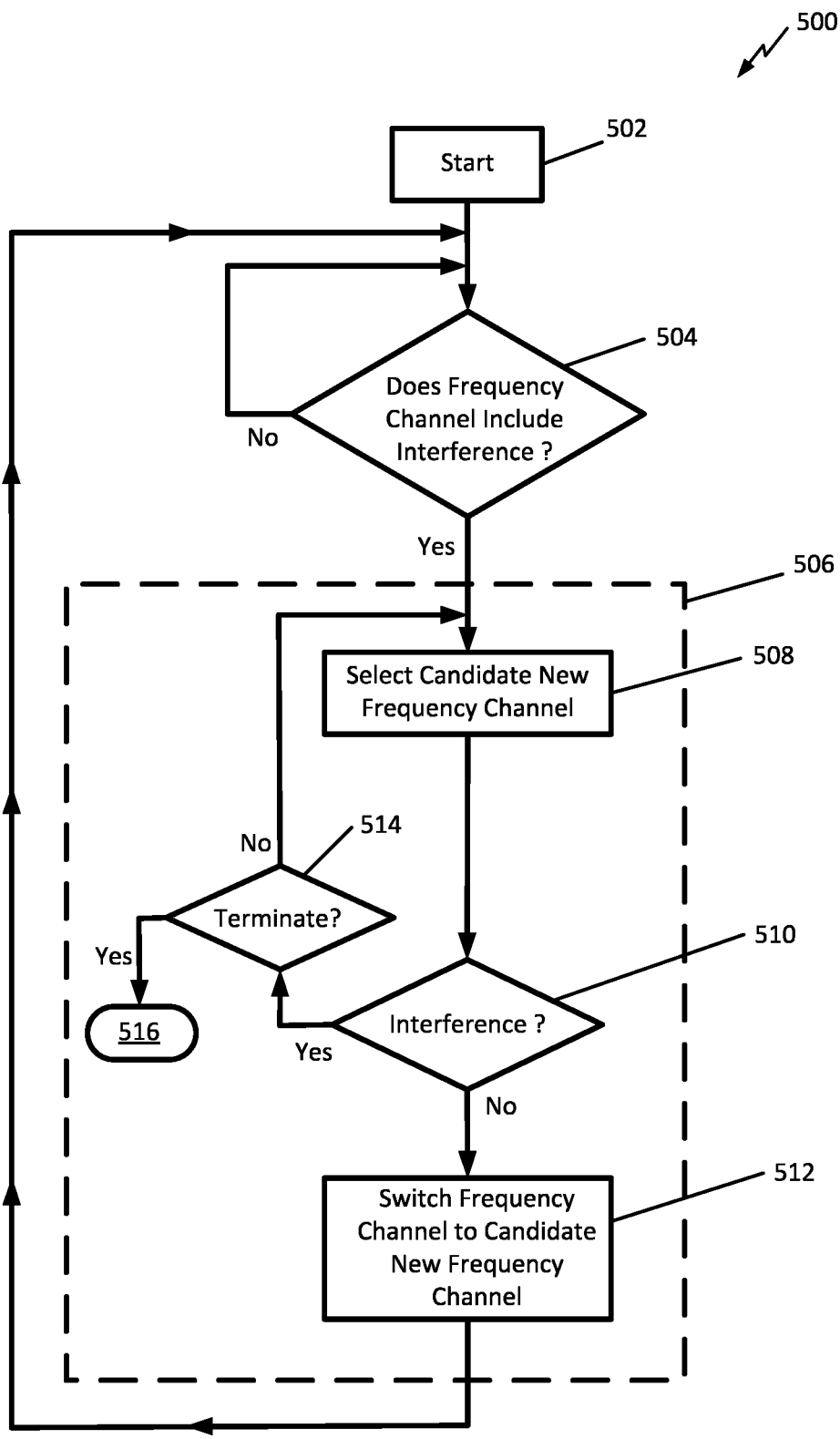
FIG. 5 illustrates a function flow chart of example operations in one process of adaptive interference mitigation according to various aspects.

FIG. 5 illustrates a function flow chart of example operations in one process of adaptive interference mitigation according to various aspects. The process will be referred to as "process 500." For convenience, certain examples of the events and contexts are described in reference to the system 100. Referring to FIG. 5, operations in the process 500 can begin at an arbitrary start 502 and proceed to 504, to apply operations of determining at a receiver, for example, the interference scanning user terminals 106 whether a received outbound carrier frequency, among a plurality of outbound carrier frequencies, includes interference. The process 500 can then proceed to 506 and apply operations that, based at least in part on a result of the determining, can select as an outbound carrier frequency for the receiver a new outbound carrier frequency among the plurality of outbound carrier frequencies. In an iteration of the process 500, the selected outbound frequency at the arbitrary start 502 can be a currently selected outbound carrier frequency among the plurality of outbound carrier frequencies. In such an iteration, the selecting operations at 506 can include, at 508, operations of selecting a candidate new outbound carrier frequency among the plurality of outbound carrier frequencies. The process 500 can then proceed to 510 and apply operations of determining whether the candidate new outbound carrier frequency, as received, includes interference. In an aspect, the processes 500 can include operations that, upon a result of the determining at 510 indicating that the candidate outbound carrier frequency does not include interference, proceeding to 512 and setting the candidate outbound carrier frequency as the new outbound carrier frequency. In one implementation of the process 500, there can be a conditional escape or loop termination at 514. One condition at 514, for example, can be the operations at 510 determining that all outbound carrier frequencies, as received, have interference. On example action can include sending a flag to the central controller (e.g., the FIG. 1 system controller 110) or and/or to the user of the terminal (e.g., the FIG. 1 scanning user terminal 106 or the FIG. 2 satellite terminal 206). Other example actions or operations at 516 can include the terminal (or the system controller) selecting an outbound carrier frequency with the least interference, or selecting another pre-set outbound carrier frequency or programmable default outbound carrier frequency.

Figure 6:
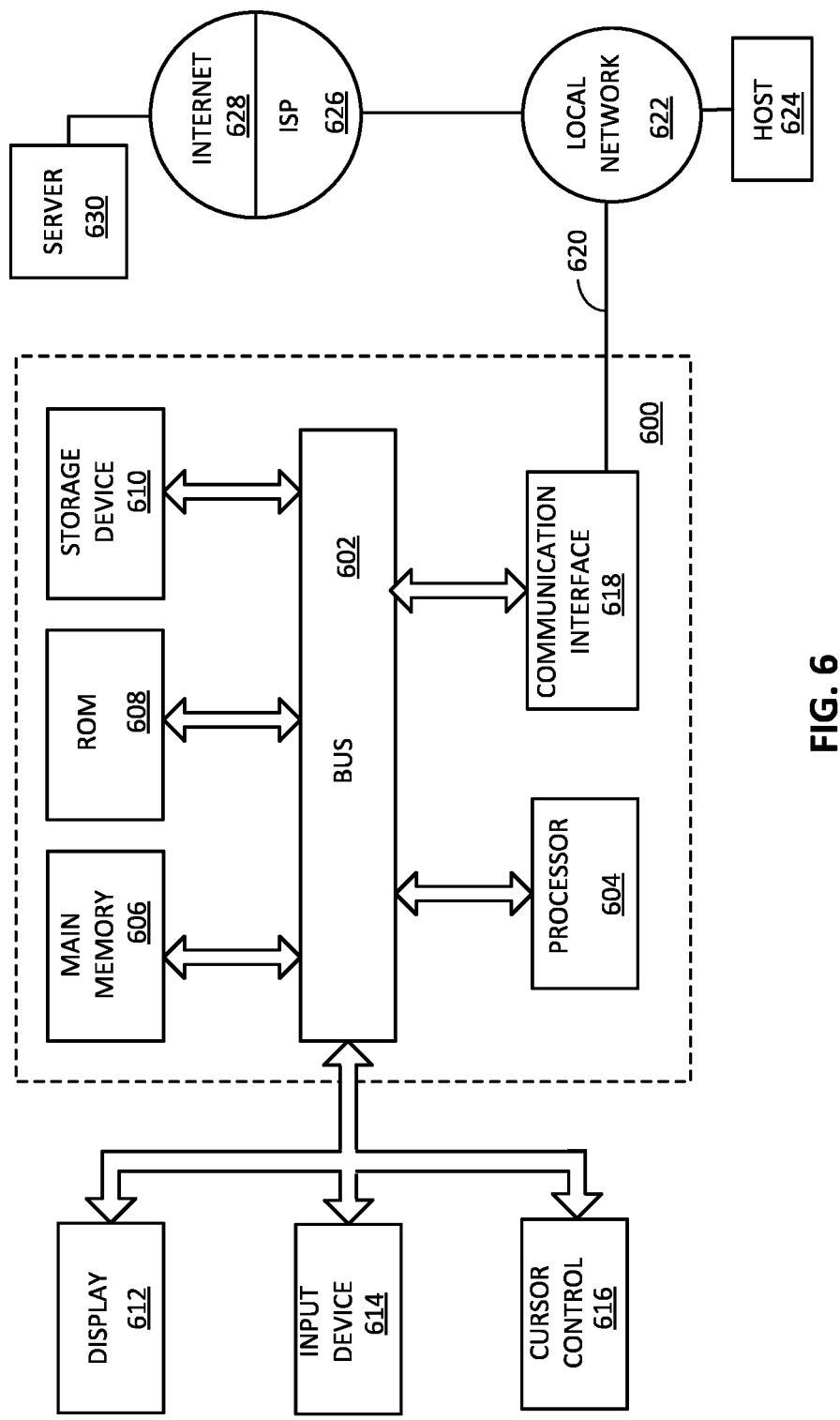
FIG. 6 is a block diagram that illustrates a computer system upon which aspects of this disclosure may be implemented.

FIG. 6 is a block diagram illustrating a computer system 600 upon which aspects of this disclosure may be implemented, such as, but not limited to the process 500. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 may be used for storing temporary variables or other intermediate information during execution of instructions to be executed by processor 604. Computer system 600 can include a read only memory (ROM) 608 or other static storage device coupled to bus 602 for storing static information and instructions for processor 604. A storage device 610, such as a magnetic disk or optical disk, can be coupled to bus 602 for storing information and instructions.

Computer system 600 may be coupled via bus 602 to a display 612, such as a cathode ray tube (CRT) or liquid crystal display (LCD), for displaying information to a computer user. An input device 614, including alphanumeric and other keys, can be coupled to bus 602 for communicating information and command selections to processor 604. A cursor control 616, such as a mouse, a trackball, or cursor direction keys can be included, for communicating direction information and command selections to processor 604 and for controlling cursor movement on display 612. The cursor control 616 can provide two degrees of freedom in two axes, a first axis (e.g., x) and a second axis (e.g., y), that allows the device to specify positions in a plane. In an aspect, a touchscreen (not separately visible in FIG. 6) can combine display 612 with hardware that registers touches upon display 612.

In an aspect, processor 604 can execute one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In some examples, hard-wired circuitry may be used in place of or in combination with software instructions to implement the various aspects of this disclosure. Thus, implementations are not limited to any specific combination of hardware circuitry and software.

The term "machine-readable medium" as used herein refers to any medium that participates in providing data that causes a machine to operation in a specific fashion. Forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

In some examples implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks. Volatile media includes such dynamic memory. Transmission media includes coaxial cables, copper wire and fiber optics, including the wires that comprise bus 602. Transmission media can also take the form of acoustic or light waves, such as those generated during radio wave and infrared data communications. All such media must be tangible to enable the instructions carried by the media to be detected by a physical mechanism that reads the instructions into a machine.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over, for example, a telephone line using a modem. A modem local to computer system 600 can receive the data on the telephone line and use, for example, an infrared transmitter to convert the data to an infrared signal. An infrared detector can receive the data carried in the infrared signal and appropriate circuitry can place the data on bus 602. Bus 602 can carry the data to main memory 606, from which processor 604 retrieves and executes the instructions. The instructions received by main memory 606 may optionally be stored on storage device 410 either before or after execution by processor 604.

Computer system 600 can include a communication interface 618 coupled to bus 602, to provide a two-way data communication coupling to a network link 620 that is connected to a local network 622. The communication interface 618 may be, for example, an integrated services digital network (ISDN) card or a modem to provide a data communication connection to a corresponding type of telephone line.

Network link 620 can provide data communication through one or more networks to other data devices. Network link 620 may provide a connection through local network 622 to a host computer 624 or to data equipment operated by an Internet Service Provider (ISP) 626. ISP 626 can provide data communication services through "Internet" 628. Local network 622 and Internet 628 can use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. The received code can be executed by processor 604 as it is received, and/or stored in storage device 610, or other non-volatile storage for later execution. Computer system 600 may obtain such code in the form of a carrier wave.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A method for interference mitigation, comprising:
   determining at a receiver whether an outbound carrier frequency, among a plurality of outbound carrier frequencies, includes interference or does not include interference by comparing a quality measurement to a threshold; and
   based at least in part on a result of the determining whether the outbound carrier frequency includes interference or does not include interference, selecting for the receiver a new outbound carrier frequency among the plurality of outbound carrier frequencies.

2. The method of claim 1, wherein the outbound carrier frequency includes acquisition symbols, and wherein determining whether the outbound carrier frequency, among the plurality of outbound carrier frequencies, as received, includes interference includes:
   detecting errors in a reception of the acquisition symbols, and
   calculating the quality measurement based, at least in part, on a result of the detecting errors.

3. The method of claim 1, wherein calculating the quality measurement includes the quality measurement as a value indicative of a ratio of energy-per-symbol of acquisition symbols to noise power spectral density of the acquisition symbols.

4. The method of claim 3, wherein selecting as an outbound carrier frequency for the receiver a new outbound carrier frequency among the plurality of outbound carrier frequencies is performed at least in part at the receiver.

5. The method of claim 1, wherein the outbound carrier frequency is a currently selected outbound carrier frequency among the plurality of outbound carrier frequencies, and wherein the selecting includes:
   selecting a candidate new outbound carrier frequency among the plurality of outbound carrier frequencies;
   determining whether the candidate new outbound carrier frequency, as received, includes interference; and upon the determining the candidate new outbound frequency, as received, does not include interference, setting the candidate new outbound carrier frequency as the new outbound carrier frequency.

6. The method of claim 1, wherein,
based at least in part on a first result of the determining that the outbound carrier frequency does not include interference, the selecting maintains the currently selected outbound carrier frequency.

7. The method of claim 6, wherein updating the outbound carrier frequency to another outbound carrier frequency includes:
tuning the receiver to the other outbound carrier frequency, and
transmitting from the receiver a carrier frequency update information that identifies the other outbound carrier frequency.

8. The method of claim 6, wherein the outbound carrier frequency, at least while the outbound carrier frequency is the currently selected outbound carrier frequency, includes active periods and idle periods, and wherein determining whether the outbound carrier frequency, as received, includes interference is performed during the idle periods.

9. The method of claim 1, wherein,
based at least in part on a second result of the determining that an outbound carrier frequency includes interference, the selecting includes updating the outbound carrier frequency to another outbound carrier frequency among the plurality of outbound carrier frequencies.

10. A terminal, comprising a processor configured to
determine whether an outbound carrier frequency, among a plurality of outbound carrier frequencies, as received, includes interference or does not include interference by comparing a quality measurement to a threshold; and
based at least in part on a result of the determining that the outbound carrier frequency includes interference or does not include interference, select as an outbound carrier frequency for the terminal a new outbound carrier frequency among the plurality of outbound carrier frequencies.

11. The terminal of claim 10, wherein to determine whether the outbound carrier frequency, among the plurality of outbound carrier frequencies, as received, includes interference includes to:
detect errors in a reception of acquisition symbols,
calculate a quality measurement based, at least in part, on a result of the detecting errors, and
determine whether there is interference based on comparing the quality measurement to a threshold.

12. The terminal of claim 11, to calculate the quality measurement includes to:
calculate the quality measurement as a value indicative of a ratio of energy-per-symbol of the acquisition symbols to noise power spectral density of the acquisition symbols.

13. The terminal of claim 11, wherein to determine whether the outbound carrier frequency, among the plurality of outbound carrier frequencies, as received, includes interference includes to:
compare the quality measurement to a threshold.

* * * * *